(12) United States Patent
Wallgren

(10) Patent No.: US 12,296,444 B2
(45) Date of Patent: May 13, 2025

(54) VACUUM ARRANGEMENT FOR A TIGHTENING TOOL

(71) Applicant: ATLAS COPCO INDUSTRIAL TECHNIQUE AB, Stockholm (SE)

(72) Inventor: Carl Johan Erik Wallgren, Stockholm (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 348 days.

(21) Appl. No.: 17/620,652

(22) PCT Filed: Jun. 23, 2020

(86) PCT No.: PCT/EP2020/067499
§ 371 (c)(1),
(2) Date: Dec. 17, 2021

(87) PCT Pub. No.: WO2020/260282
PCT Pub. Date: Dec. 30, 2020

(65) Prior Publication Data
US 2022/0241941 A1    Aug. 4, 2022

(30) Foreign Application Priority Data
Jun. 28, 2019 (SE) .................... 1930233-0

(51) Int. Cl.
*B25B 23/08* (2006.01)
*B25B 21/00* (2006.01)
*B23P 19/06* (2006.01)

(52) U.S. Cl.
CPC .............. *B25B 23/08* (2013.01); *B25B 21/00* (2013.01); *B23P 19/06* (2013.01)

(58) Field of Classification Search
CPC ....... B25B 21/00; B25B 21/002; B25B 23/00; B25B 23/02; B25B 23/04; B25B 23/08;
(Continued)

(56) References Cited

U.S. PATENT DOCUMENTS 8,789,446 B1 * 7/2014 Sungkhaphong ..... B23P 19/003
81/57.37
11,292,110 B2    4/2022 Zander
(Continued)

FOREIGN PATENT DOCUMENTS

| CN | 102152958 A | 8/2011 |
| CN | 102941470 A | 2/2013 |

(Continued)

OTHER PUBLICATIONS

Atlas Copco Industrial Technique AB, Swedish Patent Application No. 1930233-0, Search Report, Dec. 9, 2019.
(Continued)

*Primary Examiner* — Robert J Scruggs
(74) *Attorney, Agent, or Firm* — Moore & Van Allen PLLC; W. Kevin Ransom

(57) ABSTRACT

The present disclosure relates to a power screw driver comprising a housing. The housing encloses a motor and a bit drive spindle at a front end for driving a bit. The power screw driver is at the front end connectable to a vacuum adapter having screw pick-up functionality by which a screw to be mounted is brought into engagement with the bit. The power screw driver further comprises an in the housing integrated vacuum sensor arranged to sense the sub-atmospheric pressure in the vacuum adapter.

16 Claims, 3 Drawing Sheets

(58) Field of Classification Search
CPC ...... B25B 23/10; B23P 19/003; B23P 19/005; B23P 19/006; B23P 19/06; B23P 19/065
See application file for complete search history.

(56) References Cited

U.S. PATENT DOCUMENTS

| | | | |
|---|---|---|---|
| 2008/0115628 A1* | 5/2008 | Shirai | B25B 23/0057 81/55 |
| 2010/0326241 A1* | 12/2010 | Miyamoto | B23P 19/06 81/54 |
| 2011/0209589 A1* | 9/2011 | Ota | B25B 23/141 81/430 |

FOREIGN PATENT DOCUMENTS

| | | | |
|---|---|---|---|
| CN | 203831315 U | | 9/2014 |
| CN | 107000178 A | | 8/2017 |
| CN | 107791016 A | | 3/2018 |
| CN | 207206295 | * | 4/2018 |
| CN | 207206295 U | | 4/2018 |
| CN | 108858017 A | | 11/2018 |
| DE | 2236697 A1 | | 2/1974 |
| EP | 3230011 A1 | | 10/2017 |
| JP | 03277431 A | | 12/1991 |
| JP | 05060736 U | | 8/1993 |
| JP | H0560735 U | | 8/1993 |
| JP | H09131627 A | | 5/1997 |
| JP | H1190742 A | | 4/1999 |
| JP | H11104923 A | | 4/1999 |
| SE | 1451457 A1 | | 6/2016 |
| WO | 2016091768 A1 | | 6/2016 |
| WO | 2018105240 A1 | | 6/2018 |
| WO | 2018210584 A1 | | 11/2018 |

OTHER PUBLICATIONS

Atlas Copco Industrial Technique AB, International Patent Application No. PCT/EP2020/067499, International Search Report, Sep. 18, 2020.

Atlas Copco Industrial Technique AB, International Patent Application No. PCT/EP2020/067499, Written Opinion, Sep. 18, 2020.

Atlas Copco Industrial Technique AB, International Patent Application No. PCT/EP2020/067499, International Preliminary Report on Patentability, Jun. 9, 2021.

Atlas Copco Industrial Technique AB, Chinese Patent Application No. 202080046464.X, First Office Action, Feb. 23, 2023.

* cited by examiner

VACUUM ARRANGEMENT FOR A TIGHTENING TOOL

CROSS-REFERENCE TO RELATED APPLICATIONS

This application is a National Stage Patent Application (filed under 35 § U.S.C. 371) of PCT/EP2020/067499, filed Jun. 23, 2020 of the same title, which, in turn claims priority to Swedish Patent Application No. 1930233-0 filed Jun. 28, 2019 of the same title; the contents of each of which are hereby incorporated by reference.

FIELD OF THE INVENTION

The present invention generally relates to power screw drivers for tightening of screws, more particularly to a power screw driver connectable to a vacuum adapter having screw pick-up functionality by which a screw to be mounted is brought into engagement with the bit.

BACKGROUND OF THE INVENTION

Power screw drivers for tightening are known to be used in various industries. For example, in the electronics industry power screw drivers are used for tightening of small screws. Such tools commonly include a mechanism for facilitating the picking and holding of the, in many cases very small, screws utilized. Examples of such mechanism include various vacuum solutions, where vacuum is provided at a front end of the tool such that the small screws may be sucked into position at a bit or similar.

More particularly, so called vacuum adapters are known where vacuum is provided by means of an auxiliary adapter that attaches to a front end of the tool. In order for the vacuum adapter to work properly a vacuum senor sense the vacuum in the vacuum adapter. This in order for the power screw driver controller to know when a screw has been picked up by the vacuum adapter. A vacuum adapter and a vacuum sensor being auxiliary devices as such, add complexity to the system. Further, the signal from the vacuum sensor needs to be received by the power screw driver controller in order for the power screw driver controller to know when a screw has been picked up.

Hence, there exists a need for an improved solution for power screw drivers which solution solves or at least mitigates the above mentioned problem.

SUMMARY OF THE INVENTION

Accordingly, it would be desirable to provide a design enabling easier integration with vacuum adapters. In particular, it would be desirable to provide such a design which also reduces complexity to the system. To better address one or more of these concerns a hand held power tool as defined in the independent claim is provided. Preferred embodiments are defined in the dependent claims.

According to a first aspect, the present disclosure relates to a power screw driver comprising a housing. The housing encloses a motor and a bit drive spindle at a front end for driving a bit. The power screw driver is at the front end connectable to a vacuum adapter having screw pick-up functionality by which a screw to be mounted is brought into engagement with the bit. The power screw driver further comprises an in the housing integrated vacuum sensor arranged to sense the sub-atmospheric pressure in the vacuum adapter. According to the first aspect, the power screw driver provides an inventive solution to the concerns described above by means of a design incorporating an in the housing integrated vacuum sensor arranged to sense the sub-atmospheric pressure in the vacuum adapter. More particularly, by means of the inventive in the housing integrated vacuum sensor arranged to sense the sub-atmospheric pressure in the vacuum adapter the integration of the power screw driver in a production environment becomes easier. This since no external vacuum sensor needs to be added and configured in the system in which the power screw driver is used. Another advantage in exemplary embodiments is that the power screw driver can be operative to determine screw pickup status by itself based on the sensed vacuum pressure from the vacuum sensor. For example, notify extremal device that a screw has been picked up by the vacuum adapter and that the power screw driver is ready for the next step of the tightening process. Typically, that a robot or operator moves the power screw driver from a position where screws are picked up to the postilion where the screw is tightened.

According to one embodiment, the power screw driver may comprise or be connected to a controller operative to control the power screw driver. In one advantageous embodiment, the power screw driver is a handheld power screw driver for tightening of small screws comprising an internal vacuum channel or hose in order to provide a vacuum to the vacuum adapter at a first end of the power screw driver for facilitating the picking of screws. For such a tool, the provision of an in the housing integrated vacuum sensor arranged to sense the sub-atmospheric pressure in the vacuum adapter provides improved power screw driver functionality with respect with integration to other components of a power screw driver system. The skilled person however realizes that any other type of power tools is conceivable within the scope of the present invention. The skilled person further realizes that throughout the present specification, by vacuum should be understood a region with a gaseous pressure much less than atmospheric pressure, i.e. not necessarily a perfect vacuum.

According to one embodiment, the power screw driver further comprises a vacuum connection for connection to a source of sub-atmospheric pressure, the vacuum connection being connected to a vacuum channel arranged provide sub-atmospheric pressure to the vacuum adapter.

Further, according to one embodiment, the vacuum sensor is arranged to sense the vacuum in the vacuum channel and thus arranged to sense the vacuum in the vacuum adapter via the vacuum channel. According to one embodiment, the power screw driver further comprises a vacuum sensor channel connectable to the vacuum adapter and wherein the vacuum sensor is arranged to sense the vacuum in the vacuum adapter via the vacuum sensor channel. According to another embodiment, the power screw driver is further operative to provide an output signal indicative if the vacuum adapter has picked up a screw based on the sensed vacuum from the vacuum sensor. Further, according to one embodiment, the power screw driver is further operative to provide an output signal indicative if the screw is wrongly positioned on the vacuum adapter based on the sensed vacuum from the vacuum sensor.

Further objectives of, features of and advantages of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention will be described in the following illustrative and non-limiting detailed description of exemplary embodiments, with reference to the appended drawing, on which

All figures are schematic, not necessarily to scale and generally only show parts which are necessary in order to elucidate the invention, wherein other parts may be omitted or merely suggested.

DETAILED DESCRIPTION OF THE INVENTION

Figure 1:
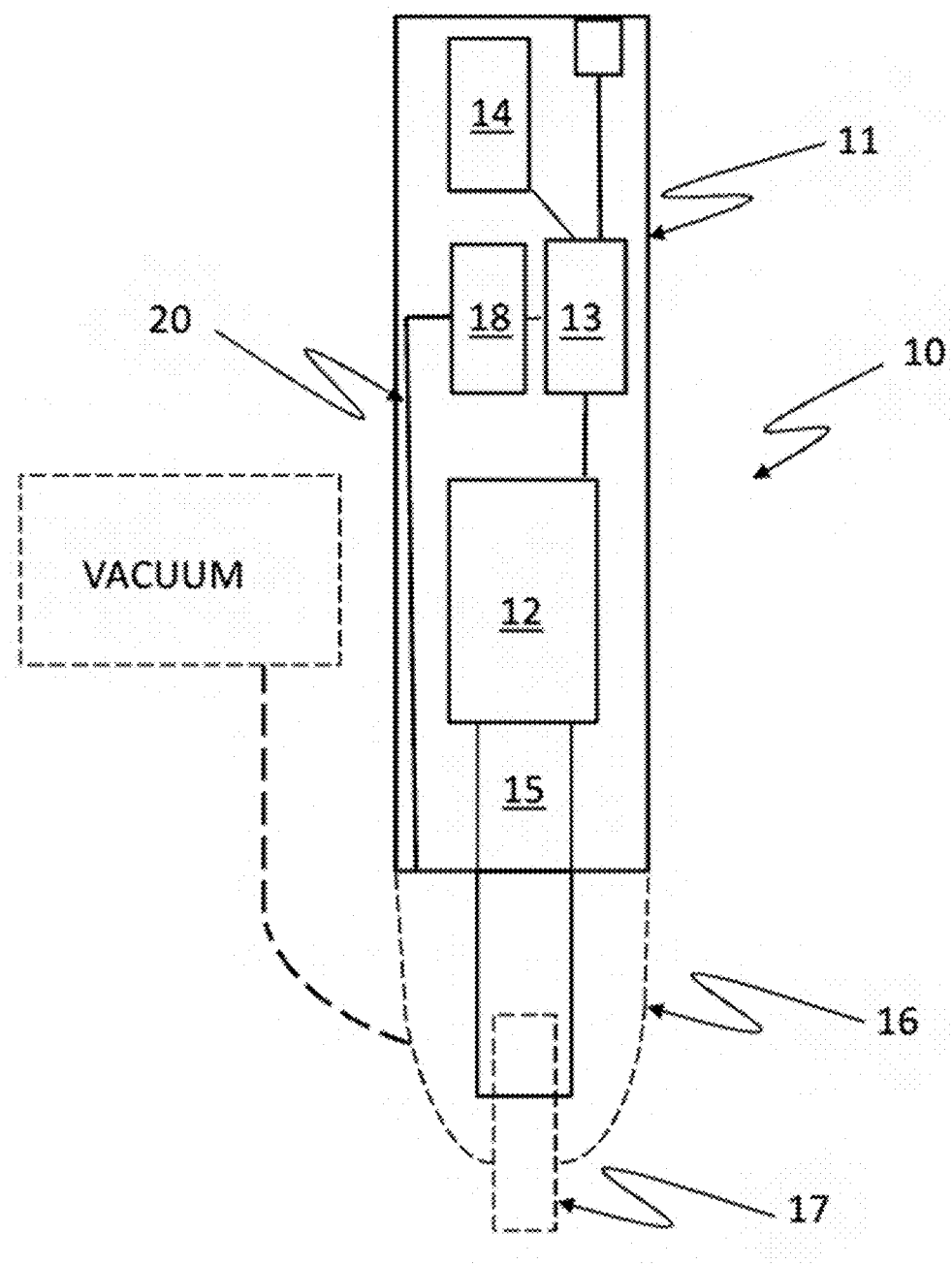
FIG. 1 is a cross sectional view of a power screw driver according to an exemplary embodiment.

FIG. 1 illustrates an exemplary embodiment of a power screw driver 10 according to the present disclosure. The power screw driver 10 comprising a housing 11, the housing 11 encloses a motor 12, a bit drive spindle 15 at a front end, for driving a bit 17. The power screw driver is at the front end connectable to a vacuum adapter 16 having screw pick-up functionality by which a screw to be mounted is brought into engagement with the bit 17. The power screw driver 10 according to the present disclosure further comprises an in the housing integrated vacuum sensor 18 arranged to sense the sub-atmospheric pressure in the vacuum adapter 16.

As mentioned above, one advantage with an integrated vacuum sensor 18 is that integration of the power screw driver 10 in a production environment becomes easier. This since no external vacuum sensor needs to be added and configured in the system in which the power screw driver 10 is used. Another advantage in exemplary embodiments is that the power screw driver 10 can be operative to determine screw pick up status by itself based on the sensed vacuum pressure from the vacuum sensor 18. For example, notify extremal device that a screw has been picked up by the vacuum adapter 16 and that the power screw drive 10 is ready for the next step of the tightening process. Typically, that a robot or operator moves the power screw driver 10 from a position where screws are picked up to the position where the screw is tightened.

In the embodiment illustrated in FIG. 1, vacuum is provided to the vacuum adapter 16 via a hose connected directly to the vacuum adapter 16. In one exemplary embodiment a vacuum sensor channel 20 is provide between the vacuum adapter and the vacuum sensor 18. The vacuum sensor channel 20 fluidly connects the vacuum adapter 16 with the vacuum sensor 18 so that the vacuum sensor 18 can sense the vacuum in the vacuum adapter 16.

The disclosure is however not limited to the embodiments where vacuum is provided via a hose directly to the vacuum adapter 16. Vacuum to the vacuum adapter 16 can also be provided via a vacuum channel in the tool as will be described in relation to FIG. 2.

Figure 2:
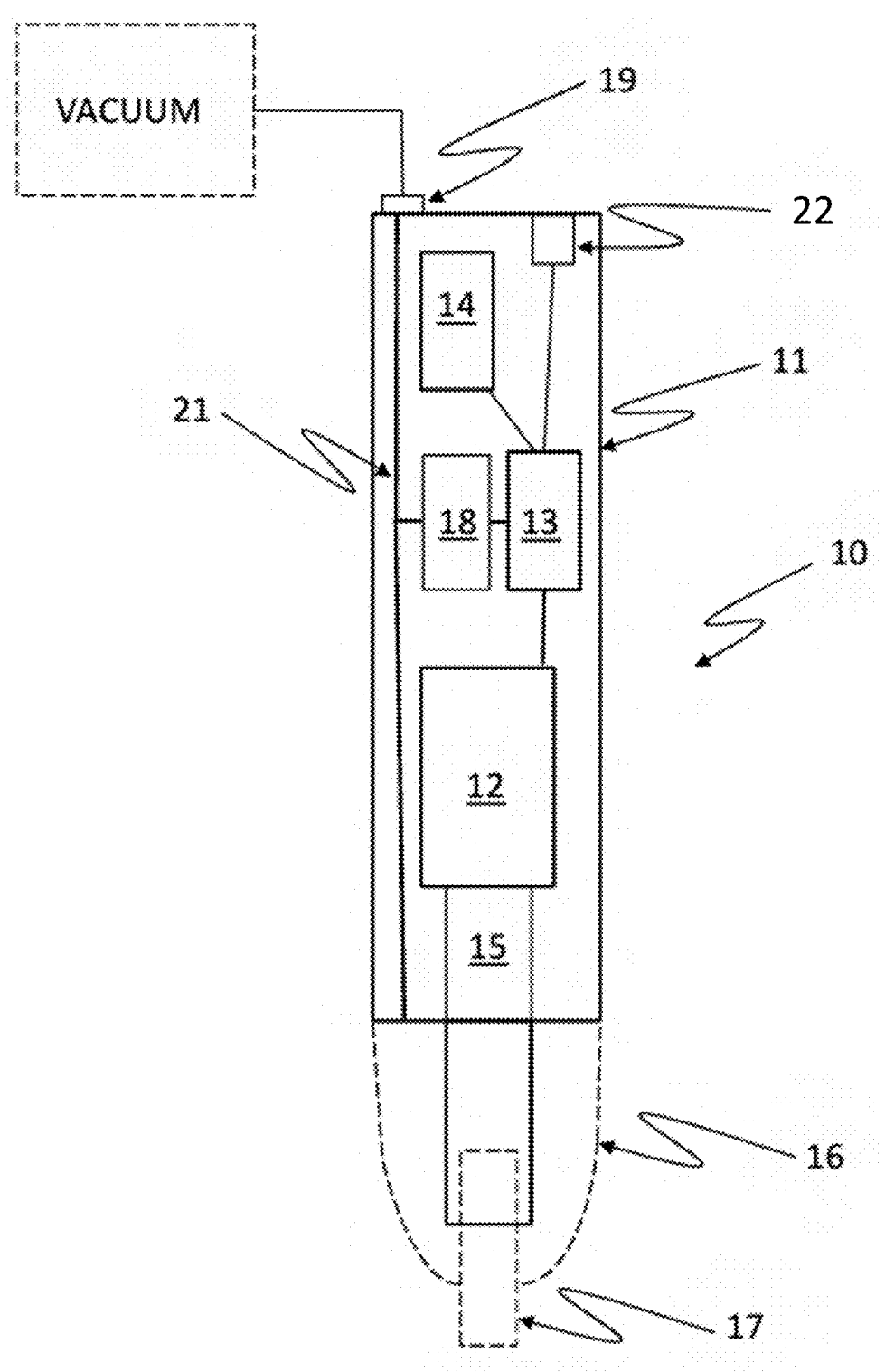
FIG. 2 is a cross sectional view of a power screw driver according to another exemplary embodiment.

Turning now to FIG. 2, which illustrates an embodiment where the power screw driver 10 further comprises a vacuum connection 19 for connection to a source of sub-atmospheric pressure. The vacuum connection 19 is connected to a vacuum channel 21 arranged provide sub-atmospheric pressure to the vacuum adapter 16. In this embodiment the vacuum sensor 18 can be connected to the vacuum channel 21 and arranged to the sense the vacuum in the vacuum channel 21 and thus arranged to sense the vacuum in the vacuum adapter 16 via the vacuum channel 21.

Figure 3:
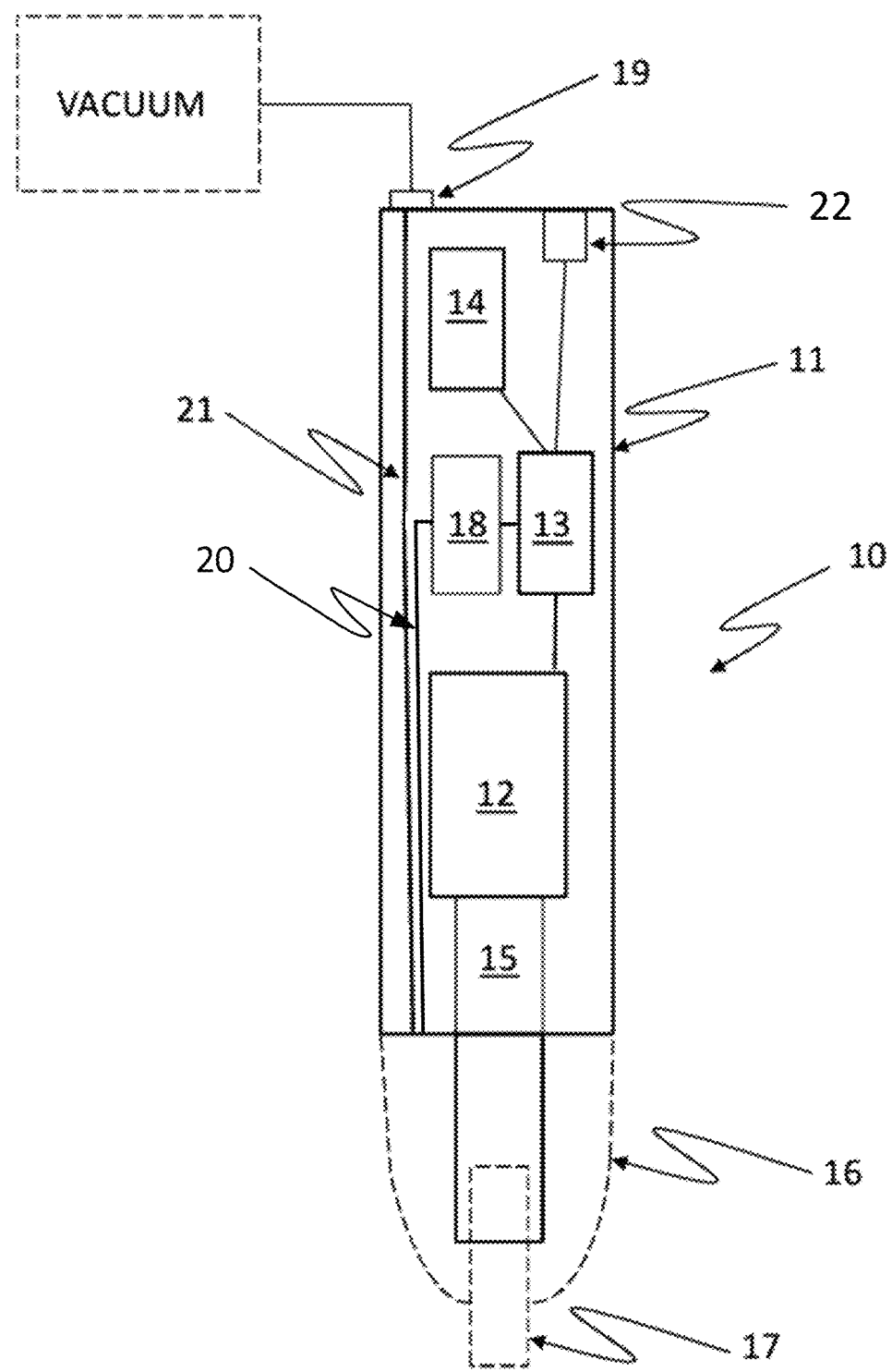
FIG. 3 is a cross sectional view of a power screw driver according to another exemplary embodiment.

In a further exemplary embodiment shown in FIG. 3, the power screw driver 10 comprises a vacuum sensor channel 20 connectable to the vacuum adapter 16. The vacuum sensor channel 20 then connects to vacuum sensor 18 to the vacuum adapter 16. In this embodiment the power screw driver 10 can thus comprise both a vacuum channel 21 and a vacuum sensor channel 20.

As illustrated in FIGS. 1-3, the power screw driver 10 further comprises a processor 13 and a memory 14 containing instructions executable by the processor 13. In one exemplary embodiment, the vacuum sensor 18 is connected to the processor 13. In one exemplary embodiment the power screw driver 10 is operative to determine screw pick up status based on the sensed vacuum from the vacuum sensor 18.

Typically, the vacuum in the vacuum adapter 16 increases when the vacuum adapter 16 has picked up a screw. Thus, the power screw driver 10 can determine a screw pick up status based on the sensed vacuum from the vacuum sensor 18. And if for instance the vacuum increased but does not reach a preset level the power screw driver 10 can determine that a screw has been picked up but that the screw is wrongly positioned on the vacuum adapter 16.

In one exemplary embodiment the screw pick up status is an indication if the screw is wrongly positioned on the vacuum adapter 16. In yet another exemplary embodiment the screw pick up status is an indication if the vacuum adapter 16 has picked up a screw.

In one exemplary embodiment the power screw driver 10 further comprises a signal output arrangement 22 connected to the processor 13. The signal output arrangement 22 can according to one exemplary embodiment be an electrical connection for connecting the power screw driver 10 via a wire to an external device. In another exemplary embodiment the signal output arrangement 22 is a wireless transceiver for wirelessly connect the power screw driver 10 to external devices.

In exemplary embodiments the power screw driver 10 is further operative to provide an output signal information based on the determined screw pick up status. In exemplary embodiments the power screw driver 10 is further operative to provide an output signal information via the signal output arrangement 22 based on the determined screw pick up status. Thus, in exemplary embodiments the power screw driver 10 is operative to provide an output signal information indicating that the screw is wrongly positioned on the vacuum adapter 16 via the signal output arrangement 22. In yet another exemplary embodiment the power screw driver 10 is operative to provide an output signal information indicating that the vacuum adapter 16 has picked up a screw.

According to one aspect of the disclosure the processor 13 comprises one or several of:

a status module adapted to determine a screw pick up status based on the sensed vacuum from the vacuum sensor 18.

The status module is implemented in hardware or in software or in a combination thereof. The status module is according to one aspect implemented as a computer program stored in the memory 14 which run on the processor 13.

While the invention has been illustrated and described in detail in the drawings and foregoing description, such illustration and description are to be considered illustrative or exemplary and not restrictive; the invention is not limited to the disclosed embodiment. The skilled person understands that many modifications, variations and alterations are conceivable within the scope as defined in the appended claims. Additionally, variations to the disclosed embodiments can be understood and effected by those skilled in the art in practicing the claimed invention, form a study of the drawings, the disclosure and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A power screw driver comprising a housing enclosing a motor and a bit drive spindle, where the bit drive spindle is located at a front end of the housing and configured for driving a bit,
wherein the front end of the housing is configured for connection to a vacuum adapter having screw pick-up functionality configured for facilitating engagement of a screw with the driving bit,
wherein the power screw driver further comprises a vacuum channel located in the housing and comprising a first end arranged to connect to a source of sub-atmospheric pressure and a second end connected to an opening in the front end of the housing to thereby provide sub-atmospheric pressure to the vacuum adapter when the vacuum adapter is connected to the housing,
wherein the power screw driver further comprises a vacuum sensor located in the housing,
wherein the power screw driver further comprises a vacuum sensor channel located in the housing, where the vacuum sensor channel comprises a first end that is in communication with the vacuum sensor and a second end connected to an opening in the front end of the housing, wherein the second end of the vacuum sensor channel is configured for communication with the vacuum adapter when the vacuum adapter is connected to the housing, and
wherein the vacuum sensor is arranged to sense a sub-atmospheric pressure in the vacuum adapter via the vacuum sensor channel.

2. The power screw driver according to claim 1, wherein the power screw driver further comprises a vacuum connection for connection to the source of sub-atmospheric pressure, wherein the vacuum connection is connected to the first end of the vacuum channel so that the vacuum connection is arranged to provide sub-atmospheric pressure to the vacuum adapter via the vacuum channel.

3. The power screw driver according to claim 1, further comprising a processor and a memory containing instructions executable by said processor, wherein the processor is operative to determine a screw pick up status based on a sensed sub-atmospheric pressure from the vacuum sensor.

4. The power screw driver according to claim 3, wherein the processor is further operative to provide an output signal based on the determined screw pick up status.

5. The power screw driver according to claim 3, wherein the screw pick up status is an indication as to whether the vacuum adapter has picked up a screw.

6. The power screw driver according to claim 3, wherein the screw pick up status is an indication that the screw is wrongly positioned on the vacuum adapter.

7. The power screw driver according to claim 1, wherein the power screw driver is a handheld power screw driver for tightening of small screws.

8. A power screw driver comprising a housing enclosing a motor and a bit drive spindle, where the bit drive spindle is located at a front end of the housing and configured for driving a bit,
wherein the housing comprises a housing body having front and back ends and a central portion, where the central portion extends radially outward from a central axis of the housing body and extends along the central axis between the front and back ends of the housing body,
wherein the front end of the housing body is configured for connection to a vacuum adapter having screw pick-up functionality configured for facilitating engagement of a screw with the driving bit,
wherein the power screw driver further comprises a vacuum sensor located in the housing body,
wherein the power screw driver further comprises a vacuum channel extending from the back end of the housing body to the front end of the housing body where a first end of the vacuum channel that is arranged for communication with the source of sub-atmospheric pressure at the back end of the housing body and a second end of the vacuum sensor channel is connected to an opening in the front end of the housing body and configured for communication with the vacuum adapter when the vacuum adapter is connected to the front end of the housing body,
wherein the power screw driver further comprises a vacuum sensor channel located in the housing body that is in communication with the vacuum sensor and the front end of the housing and is configured for communication with the vacuum adapter when the vacuum adapter is connected to the housing, and
wherein the vacuum sensor is arranged to sense a sub-atmospheric pressure in the vacuum adapter via the vacuum sensor channel.

9. The power screw driver according to claim 8, wherein the vacuum sensor channel comprises a first end that is in communication with the vacuum sensor and a second end connected to the vacuum channel, wherein the second end of the vacuum sensor channel is configured for communication with the vacuum adapter via the vacuum channel.

10. The power screw driver according to claim 8, wherein the vacuum sensor channel comprises a first end that is in communication with the vacuum sensor and a second end connected to an opening in the front end of the housing body, wherein the second end of the vacuum sensor channel is configured for communication with the vacuum adapter when the vacuum adapter is connected to the front end of the housing body.

11. The power screw driver according to claim 8, wherein the power screw driver further comprises a vacuum connection for connection to the source of sub-atmospheric pressure, wherein the vacuum connection is connected to the first end of the vacuum channel so that the vacuum connection is arranged to provide sub-atmospheric pressure to the vacuum adapter via the vacuum channel.

12. The power screw driver according to claim 8, further comprising a processor and a memory containing instructions executable by said processor, wherein the processor is operative to determine a screw pick up status based on a sensed pressure from the vacuum sensor.

13. The power screw driver according to claim 12, wherein the processor is further operative to provide an output signal based on the determined screw pick up status.

14. The power screw driver according to claim 12, wherein the screw pick up status is an indication as to whether the vacuum adapter has picked up a screw.

15. The power screw driver according to claim 12, wherein the screw pick up status is an indication that the screw is wrongly positioned on the vacuum adapter.

16. The power screw driver according to claim 8, wherein the power screw driver is a handheld power screw driver for tightening of small screws.

* * * * *